United States Patent [19]
Siegmund

[11] Patent Number: 5,853,834
[45] Date of Patent: Dec. 29, 1998

[54] METALLIZED LAYER CORROSION PROTECTION SYSTEM FOR PIPE OR TUBING

[75] Inventor: Al Siegmund, Houston, Tex.

[73] Assignee: ICO, Inc., Houston, Tex.

[21] Appl. No.: 922,738

[22] Filed: Sep. 3, 1997

Related U.S. Application Data

[63] Continuation of Ser. No. 508,488, Jul. 28, 1995, abandoned.

[51] Int. Cl.$^6$ .............................. C23C 4/08; B29D 22/00
[52] U.S. Cl. .................. 428/36.9; 428/36.91; 428/35.8; 428/35.9; 138/143; 138/145; 138/146; 427/455; 427/456; 427/487
[58] Field of Search ..................... 428/911, 586, 428/615, 36.91, 457, 36.9, 35.8, 35.9; 138/143, 146, 140, 145, 96 R; 427/455, 456, 487

[56] References Cited

U.S. PATENT DOCUMENTS

| | | |
|---|---|---|
| 2,794,448 | 6/1957 | Marantz ................................ 138/68 |
| 2,818,083 | 12/1957 | Jelm .................................... 138/68 |
| 4,243,699 | 1/1981 | Gibson ................................ 427/183 |
| 4,254,165 | 3/1981 | Phelps et al. ..................... 428/36.91 |
| 4,382,421 | 5/1983 | Warren et al. ...................... 118/663 |
| 4,490,411 | 12/1984 | Feder ................................... 427/46 |
| 4,551,354 | 11/1985 | Feder ................................... 427/46 |
| 4,552,091 | 11/1985 | Feder ................................. 118/620 |
| 4,698,241 | 10/1987 | Roberson ........................... 427/183 |
| 4,774,905 | 10/1988 | Nobis .................................. 118/304 |
| 4,816,099 | 3/1989 | Yamabe .............................. 156/73.1 |
| 4,820,591 | 4/1989 | Ramanarayanan .................. 428/628 |
| 4,943,489 | 7/1990 | Kuhara et al. ...................... 428/586 |
| 5,059,453 | 10/1991 | Bernsten, Jr. ...................... 427/231 |
| 5,145,710 | 9/1992 | Quadflieg et al. .................. 427/34 |
| 5,151,308 | 9/1992 | Moskowitz et al. ................ 428/615 |
| 5,413,638 | 5/1995 | Bernstein, Jr. et al. ............ 118/620 |

Primary Examiner—Rena L. Dye
Attorney, Agent, or Firm—Alan R. Thiele; Jenkens & Gilchrist

[57] ABSTRACT

A system for protecting sections of pipe or tubing from corrosion includes depositing a continuous, low-porosity, non-corrosive, metallized layer within the end portions of a section of pipe or tubing and on its end walls.

3 Claims, 2 Drawing Sheets

METALLIZED LAYER CORROSION PROTECTION SYSTEM FOR PIPE OR TUBING

This application is a continuation, of application Ser. No. 08/508,488, filed Jul. 28, 1995 now abandoned.

BACKGROUND OF THE INVENTION

The present invention pertains to corrosion protection systems; more particularly, the present invention pertains to corrosion protection systems to be used with pipe or tubing.

Corrosion of pipe or tubing, particularly pipe or tubing used in oil wells, gas wells, geothermal wells, or water wells, is often caused by subjecting the pipe or tubing to a harsh corrosive environment. This harsh corrosive environment weakens and eventually renders the pipe or tubing unusable. To protect the pipe or tubing used in harsh corrosive environments from corrosion, it has been found that both the interior and the end portions of the pipe or tubing can be coated with an organic protective coating. Such organic protective coatings are generally applied to the interior and the end portions of the pipe or tubing as liquid or powder.

While organic protective coatings are effective in substantially reducing the corrosion of pipe or tubing, the integrity of these organic protective coatings is often compromised by rough handling of the pipe or tubing. Such rough handling may cause breaks or anomalies, known as "holidays," in the organic protective coating. When such holidays occur, the pipe or tubing underlying the holiday in the protective coating will eventually corrode.

It has also be found that the flow of various fluids will wear away organic protective coatings. Thus, such fluid flow also compromises the integrity of the organic protective coating.

In still other situations, it has been found that when well-logging equipment is passed through the pipe or tubing, the well-logging equipment may strike the interior wall of the pipe or tubing, chip the organic protective coating and, thus, compromise the integrity of the organic protective coating.

In still other applications, the interior surface of a section of pipe or tubing is metallized for corrosion protection. While effective, such metallizing systems require heating the section of pipe or tubing and may thereby adversely change the strength or durability of the pipe or tubing by altering its metallurgical properties. Such heating may also nullify any manufacturer's guarantee or warranty of the pipe or tubing.

As it is almost impossible to avoid; (i) the rough handling of pipe or tubing sections, (ii) the wear caused by fluid flow, or (iii) the physical damage caused by well logging equipment; holidays in the organic protective coating will occur. There is, therefore, a need to provide a system by which corrosion protection is still provided to the pipe or tubing even if holidays occur in the organic protective coating. In addition, there is a need to provide a corrosion protection system which can be applied without heating and, thereby, not change the metallurgical properties of the pipe or tubing section to which it is applied.

SUMMARY OF THE INVENTION

The metallized layer corrosion protection system of the present invention assures that corrosion protection is provided to the end portion of a section of pipe or tubing even if the inevitable holidays occur in the organic corrosion protective coating. In addition, the metallized layer corrosion protection system of the present invention is applied to the end portion of the section of pipe or tubing. No heating of the section of pipe or tubing is required. Specifically, a continuous, low-porosity, non-corrosive, metallized layer is deposited along the interior wall and the end wall of the end portion of a section of pipe or tubing. Applied over the continuous, low-porosity, non-corrosive, metallized layer is a liquid or powder organic corrosion protective coating.

In an alternate embodiment, the layer of continuous, low-porosity, non-corrosive metal extends beyond the end wall of the end portion of a section of pipe or tubing and onto the chamfer portion up to but not including the threaded portion.

The layer of continuous, low-porosity, non-corrosive metal is applied to the end portion of a section of pipe or tubing using a high-velocity oxygen-feed system. While any non-corrosive metal may be used, stainless steel, nickel-chromium alloy, Hastelloy C or Inconel are examples of commonly available non-corrosive metals that may be used.

In another alternate embodiment of the present invention, the continuous, low porosity, non-corrosive, metallized layer is applied to the surface of a flat plate. The flat plate is then shaped to become a section of seam-welded pipe or tubing. Specifically, the layer of continuous, low-porosity, non-corrosive metal is applied to that surface of the flat plate which becomes the interior wall of the section of pipe or tubing, to the end walls, and to the seam walls which are welded together. In such applications, the entire interior wall of the seam-welded pipe or tubing is coated with a layer of continuous, low-porosity, non-corrosive metal.

BRIEF DESCRIPTION OF THE DRAWINGS

A better understanding of the metallized layer corrosion protection system for pipe or tubing of the present invention may be had by reference to the drawings wherein.

DESCRIPTION OF THE EMBODIMENTS

Figure 1:
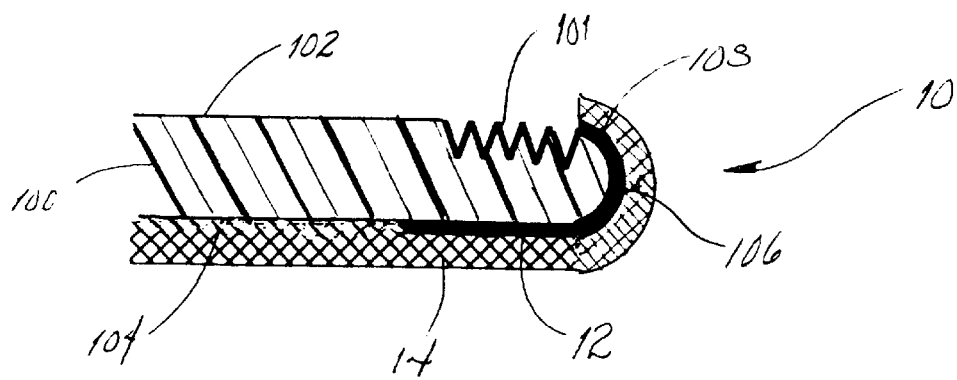
FIG. 1 is a cross-sectional view of one wall of the end portion of a section of bullet-nosed threaded tubing.

A better understanding of the corrosion protection system of the present invention may be had by reference to FIG. 1. Therein, it may be seen that the end portion 102 of a piece of tubing 100 includes an interior wall 104, an end wall 106, a chamfer portion 108, and a threaded portion 101. The threaded portion 101 is used to connect one section of tubing 100 with another. While threaded tubing 100 is shown in FIG. 1, it will be understood that the present system also may be used with sections of pipe.

To protect the end portion 102 of a section of tubing 100 from corrosion, it has been found that coating the interior wall 104, the end wall 106, and the chamfer portion 108 with an organic protective layer 14 will be effective in some circumstances. However, such organic protective layer 14 may be damaged by rough handling, fluid flow wear, or well logging equipment passing through the tubing 100. Such damage manifests itself as holidays in layer 14. When such holidays occur, the underlying tubing 100 is exposed to a corrosive environment.

The corrosion protection system of the present invention 10 adds a second corrosion protection barrier 12 under the most critical portions of the organic corrosion protection layer 14. Specifically, a continuous layer 12 of low-porosity, non-corrosive metal is deposited inside the section of tubing 100 to a depth of approximately the diameter of the tubing from the end wall 106. Further, this continuous, low-porosity, non-corrosive metallized layer 12 is applied to both the end wall 106 and the chamfer portion 108.

Once the continuous, low-porosity, non-corrosive, metallized layer 12 has been applied to the end portion 102 of a section of tubing 100, as shown in FIG. 1, the exposed interior wall 104 and the layer of continuous, low-porosity, non-corrosive, metal are further protected with an organic corrosion protective coating 14 such as normally applied in liquid or powder form.

Thus, if the end portion 102 of a section of tubing 100 is handled roughly or is exposed to a condition that causes a holiday in the organic protective coating, then corrosion protection is provided by the underlying continuous, low-porosity, non-corrosive, metallized layer 12.

Figure 2A:
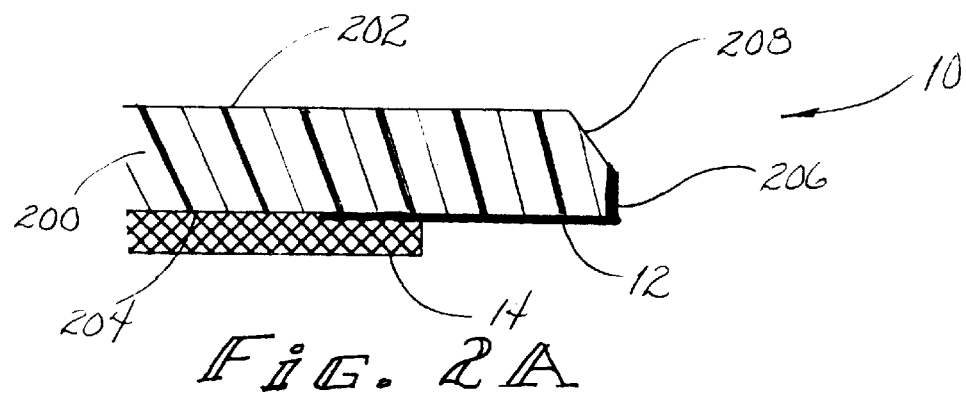
FIG. 2A is a cross-sectional view of one wall of the end portion of a section of welded line pipe.

In FIG. 2A, the end portion 202 of a section of line pipe 200 is shown. Like the bullet-nosed tubing section 100 shown in FIG. 1, the line pipe section 200 of FIG. 2 has an interior wall 204, an end wall 206, and a chamfer portion 208.

Figure 2B:
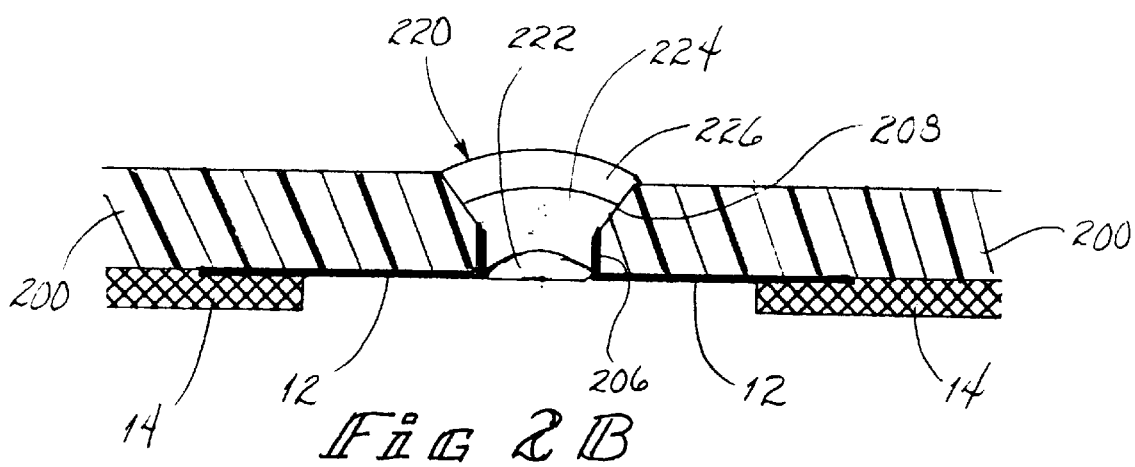
FIG. 2B is a cross-sectional view of a weld connection between the end portions of two sections of welded line pipe.

FIG. 2B illustrates how the sections of pipe 200 shown in FIG. 2A are welded 220 together. Specifically, a tack weld 222 using a corrosion resistant welding rod is put in place first. The tack weld 222 is covered by hot pass 224 using a corrosion resistant welding rod. The hot pass 224 is then covered by a cap weld 226 made with a corrosion resistant welding rod. To properly provide corrosion protection to both the pipe joint and to the end portions 202 of the sections of pipe 200 to be welded together, it will be seen that the continuous, low-porosity, non-corrosive metallized protective layer 12 extends not only along the interior wall 204 of the pipe section 200 but also over the end wall 206. Because the continuous, low-porosity, non-corrosive layer is a weldable metal, the weld joint 220 may be formed between the coated end walls 206. If the end walls 206 pipe sections 202 were merely coated with an organic protective coating, the welding process would burn off or destroy the organic protective coating.

Figure 3A:
FIG. 3A is a flat plate of metal including a continuous, low-porosity, non-corrosive metallized layer before the flat plate is formed into a section of seam-welded pipe or tubing.
Figure 3B:
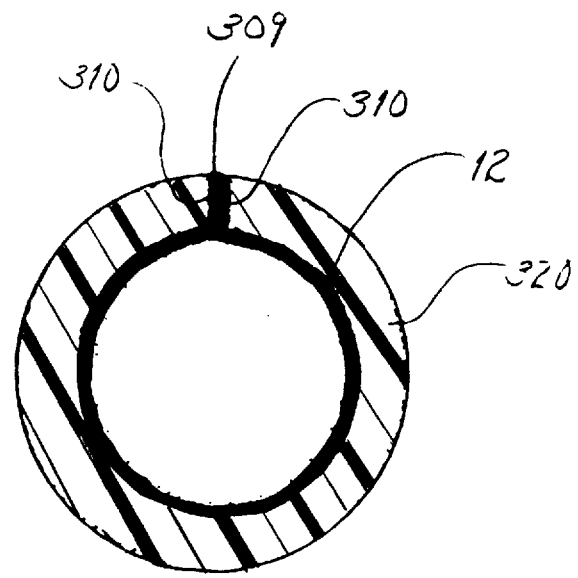
FIG. 3B is a cross-sectional view of the flat plate shown in FIG. 3A wherein the flat plate has been formed into a section of cylindrical seam-welded pipe or tubing.

FIG. 3A shows a flat piece of metal 300. The flat piece of metal 300 will eventually be run though a mandril and cylindrically bent so that it becomes a section of cylindrical pipe or tubing 320, as shown in FIG. 3B.

The section of cylindrical pipe or tubing 320 is formed by welding the cylindrically bent flat plate 300 along its seam 309 which is formed by the coming together of the two seam walls 310. Because the two seam walls 310 have been covered with the continuous, low-porosity, non-corrosive, metallized layer 12 of the present invention, they may be easily welded together using a corrosion resistant welding rod. To further protect the end walls (not shown) of the seam-welded pipe or tubing section 320 shown in FIG. 3B, it will also be necessary to coat the end walls of the pipe or tubing section 320, as previously disclosed in FIGS. 1 and 2A.

The application of the continuous, low-porosity, non-corrosive metallized layer 12 to the flat plate 300 is most effective if done prior to the forming of the flat plate 300 into a section of seam-welded pipe or tubing 320. Specifically, the non-corrosive metal is applied to that surface 302 of the flat plate 300 which will become the interior wall 302 of the section of seam-welded pipe or tubing 320, the seam walls 310 at the edge of the flat plate 300, and the end walls of the flat plate (not shown) before the flat plate 300 is fed through a mandril and formed into a section of pipe or tubing 320. By applying the continuous layer of non-corrosive metal in this way, the interior wall 302 of the welded-seam pipe or tubing 320 will be completely coated with a non-corrosive metal 12. As previously indicated, the use of a high-velocity oxygen-feed system to deposit a non-corrosive metal 12 on the interior wall 302 of a welded seam section of pipe or tubing 320 allows a low-porosity, non-corrosive metallized layer 12 to be formed.

While there are many ways of depositing non-corrosive metals on sections of pipe or tubing, such as flame spraying or plasma spraying, such metal spraying methods often fall short of providing the required degree of corrosion protection because of the porosity of the resulting metallized layer. It has been found that by applying a non-corrosive metal using a high-velocity oxygen-feed system, the problem of porosity in the non-corrosive metallized protection layer is effectively eliminated. It will be understood that in the description of the present invention, the term "low porosity" shall mean a porosity level of 1% or lower. Another advantage of using a high-velocity oxygen-feed system is that no heating is required of the base metal in the pipe or tubing to which the continuous, low-porosity, non-corrosive metallized layer is applied.

While a variety of non-corrosive metals may be applied to sections of pipe or tubing using high-velocity oxygen-feed systems, it has been found that commonly available stainless steel, nickel-chromium alloy, Hastelloy C and Inconel provide satisfactory results.

Having now disclosed the present invention in terms of its embodiments, it will be understood by those of ordinary skill in the art that other embodiments of the invention are apparent. Such other embodiments shall fall within the scope and meaning of the appended claims.

I claim:

1. A system for increasing the serviceability of a primarily internally coated section of metal pipe or tubing to be used with oil and gas wells once a break caused by mechanical contact or rough handling has occurred in that portion of said internal coating which is present on the interior and partially along the exterior of the end portion of said primarily internally coated section of metal pipe or tubing, said system comprising:

a hollow metal cylinder having an internal diameter, and further including an end portion said end portion, including an interior wall, an end wall, and a chamfer; said hollow metal cylinder having a first protective organic coating along said internal diameter and over said end portion;

a second continuous, non-corrosive metallized layer having a porosity of about 1% under that area of the coating formed on said end portion of said primarily internally coated hollow metal cylinder;

said continuous, non-corrosive metallized layer extending:

inwardly along said interior wall of said hollow metal cylinder from said end wall for a length equal to about one internal diameter, over said end wall, and over said chamfer;

said continuous, non-corrosive metallized layer being applied by a high-velocity, oxygen-feed, metal spray system using a metal selected from a group including stainless steel, nickel-chromium alloy, or non-corrosive metals.

2. A method for making a section of primarily internally coated metal pipe or tubing to be used with an oil and gas well, said section of primarily internally coated metal pipe or tubing having increased serviceability once a break caused by mechanical contact or rough handling has occurred in that portion of said internal coating which is present on the interior and partially along the exterior of said primarily internally coated section of metal pipe or tubing, said method comprising the steps of:

selecting a hollow metal cylinder having an internal diameter, and an end portion including an interior wall, an end wall, and a chamfer;

depositing a continuous non-corrosive metallized layer having a porosity of about 1%:
inwardly along said interior wall of said hollow metal cylinder from said end wall for a length equal to about one internal diameter,
over said end wall, and
over said chamfer; by a high velocity, oxygen feed, metal spraying system using a metal selected from a group including stainless steel, nickel-chromium alloy, or non-corrosive metals;

coating the hollow metal cylinder along its internal diameter and over its end portion with an organic coating.

3. A section of primarily internally coated metal pipe or tubing used with an oil and gas well, said section of primarily internally coated metal pipe or tubing having continued serviceability following a break in that portion of said coating which is present on the interior and partially along the exterior of said end portion of said primarily internally coated metal pipe or tubing section, said break being caused by mechanical contact or rough handling, said section of primarily internally coated metal pipe or tubing comprising:

a hollow metal cylinder having an internal diameter and further including an end portion having an interior wall, an end wall, and a chamfer;

said hollow metal cylinder having a first protective organic coating along said internal diameter and over said end portion;

said end portion further having a second continuous, non-corrosive metallized coating having a porosity of about 1% under that area of said first protective organic coating on said end portion of said internally coated hollow metal cylinder;

said second continuous, non-corrosive metallized coating extending:
inwardly along said interior wall of said hollow metal cylinder from said end wall for a length equal to about one internal diameter,
over said end wall, and
over said chamfer, said continuous, non-corrosive metallized layer being applied by a high-velocity, oxygen-feed, metal spray system using a metal selected from a group including stainless steel, nickel-chromium alloy, or non-corrosive metals.

\* \* \* \* \*